United States Patent
Abouraddy et al.

(10) Patent No.: US 10,001,616 B1
(45) Date of Patent: Jun. 19, 2018

(54) UNDERWATER FIBER OPTIC CABLE WITH A PREDETERMINED BUOYANCY AND ASSOCIATED METHODS

(71) Applicants: UNIVERSITY OF CENTRAL FLORIDA RESEARCH FOUNDATION, INC., Orlando, FL (US); HARRIS CORPORATION, Melbourne, FL (US)

(72) Inventors: Ayman F. Abouraddy, Oviedo, FL (US); Felix A. Tan, Orlando, FL (US); Donna M. Kocak, Indialantic, FL (US)

(73) Assignees: UNIVERSITY OF CENTRAL FLORIDA RESEARCH FOUNDATION, INC., Orlando, FL (US); HARRIS CORPORATION, Melbourne, FL (US)

( * ) Notice: Subject to any disclaimer, the term of this patent is extended or adjusted under 35 U.S.C. 154(b) by 0 days. days.

(21) Appl. No.: 15/487,575

(22) Filed: Apr. 14, 2017

(51) Int. Cl.
  *G02B 6/44* (2006.01)

(52) U.S. Cl.
  CPC ......... *G02B 6/4427* (2013.01); *G02B 6/4432* (2013.01); *G02B 6/4486* (2013.01); *G02B 6/4494* (2013.01)

(58) Field of Classification Search
  CPC ........................... G02B 6/4427; G02B 6/4486
  See application file for complete search history.

(56) References Cited

U.S. PATENT DOCUMENTS

| | | | |
|---|---|---|---|
| 3,433,891 A | 3/1969 | Zysk et al. | |
| 4,447,122 A * | 5/1984 | Sutehall | G02B 6/4416 174/113 A |
| 5,706,381 A * | 1/1998 | Pokorny | G02B 6/4427 385/100 |
| 6,096,804 A | 8/2000 | Whiteley et al. | |
| 6,663,453 B2 * | 12/2003 | Quigley | B32B 1/08 405/171 |
| 7,570,853 B2 | 8/2009 | Mahapatra et al. | |
| 7,822,306 B2 * | 10/2010 | Shinoski | G02B 6/4427 385/100 |
| 8,369,673 B2 * | 2/2013 | Hawkes | G02B 6/443 385/123 |
| 8,835,765 B2 | 9/2014 | Jiang et al. | |
| 8,842,956 B2 | 9/2014 | O'Riorden et al. | |
| 2010/0183269 A1 | 7/2010 | Mahapatra et al. | |
| 2013/0319721 A1 | 12/2013 | Hui | |
| 2015/0187459 A1 | 7/2015 | Fairchild et al. | |

OTHER PUBLICATIONS

Linden Photonics, Inc. "Bouyant Cable" www.lindenphotonics. com; retrieved from Internet Feb. 2, 2017: pp. 4.

* cited by examiner

*Primary Examiner* — Omar R Rojas
(74) *Attorney, Agent, or Firm* — Allen, Dyer, Doppelt + Gilchrist, P.A. Attorneys at Law (57) ABSTRACT

An underwater fiber optic cable includes an optical fiber, and a jacket surrounding the optical fiber. The jacket includes a polymer having a first density, and particles distributed throughout the polymer having a second density greater than the first density. The particles have a predetermined volume fraction to thereby provide the underwater cable with a predetermined buoyancy when underwater.

13 Claims, 8 Drawing Sheets

UNDERWATER FIBER OPTIC CABLE WITH A PREDETERMINED BUOYANCY AND ASSOCIATED METHODS

GOVERNMENT RIGHTS

This invention was made with government support under contract number N66001-15-4007 awarded by the U.S. Navy. The government has certain rights in the invention.

TECHNICAL FIELD

The present invention relates to the field of fiber optic cables, and more particularly, to a buoyancy controlled underwater fiber cable and related methods.

BACKGROUND

Lightweight and buoyant fiber optic cables have many useful applications in an underwater environment. Remotely operated vehicles (ROVs), for example, may be tethered by a fiber optic cable. The fiber optic cable may include an optical fiber for transferring data and an electrical conductor for supplying electrical power to a remotely operated vehicle. The performance of these vehicles can be impaired by the drag and weight of the fiber optic cable.

Marine surface vessels may tow fiber optic cables for a variety of purposes, such as for sonar scanning and marine seismic surveying. It is often desirable to vary the depth at which each portion of a cable is towed. For example, in marine seismic surveying, one or more fiber optic cables (known as streamers) including hydrophones are towed by a vessel. The streamers may be several kilometers or more in length. In some applications, it may be desirable to maintain an entire length of the streamers in a horizontal position so that the hydrophones are towed at the same depth. Alternatively, some sections of the streamers may be maintained at shallower depths than other sections.

Small unmanned autonomous vehicles may tow cables coupled to sensors and communication buoys. These cables may be towed at fixed depths or even on a surface of the water. Similarly, the performance of these vehicles can be impaired by the drag and weight of the cable.

One approach to control the buoyancy of a fiber optic cable is to add material to the cable. While effective for controlling buoyancy, the added material causes the diameter of the fiber optic cable to change. If the diameter of the cable is significantly increased, for example, then the other components of the cable may have to be reengineered. Another disadvantage of increasing the diameter of the fiber optic cable means that the size of the spools used to store and transport the cable is increased as well.

SUMMARY

An underwater fiber optic cable includes at least one optical fiber, and a jacket surrounding the at least one optical fiber. The jacket may comprise a polymer having a first density, and a plurality of particles distributed throughout the polymer having a second density greater than the first density, and having a predetermined volume fraction to thereby provide the underwater cable with a predetermined buoyancy when underwater.

The buoyancy of the underwater fiber optic cable may thus be changed by changing the predetermined volume amount of the particles added to the jacket. The particles may be referred to as nanoparticles which are advantageously sized so that when distributed throughout the polymer a diameter of the jacket remains the same. This allows buoyancy control of the underwater fiber optic cable to be independent of other cable parameters.

The particles may have an average size less than 500 nm, for example. More specifically, the particles may have an average size in a range of 100 nm to 300 nm, for example.

The particles may have a volume fraction of less than 0.4, for example. More specifically, the particles may have a volume fraction in a range of 0.1 to 0.3, for example.

The jacket may have an outer diameter less than 5 mm, for example. More specifically, the jacket may have an outer diameter in a range of 500 um to 3.5 mm, for example.

The predetermined volume fraction may vary along a length of the jacket so that the predetermined buoyancy varies along the length of the jacket. The jacket may have a constant outer diameter along the length of the jacket as the predetermined buoyancy varies.

The particles may comprise titanium dioxide, zinc dioxide and/or zinc sulfide, for example. The polymer may comprise a thermoplastic elastomeric polymer, for example.

Another aspect is directed to a method for making an underwater fiber optic cable having a predetermined buoyancy. The method comprises determining a desired buoyancy of the underwater fiber optic cable, advancing at least one optical fiber along a path, and extruding a jacket surrounding the advancing at least one optical fiber. The jacket may comprise a polymer having a first density, and a plurality of particles distributed throughout the polymer having a second density greater than the first density, and having a predetermined volume fraction to thereby provide the underwater cable with a predetermined buoyancy when underwater.

DETAILED DESCRIPTION

The present disclosure will now be described more fully hereinafter with reference to the accompanying drawings, in which preferred embodiments of the disclosure are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notations are used to indicate similar elements in alternative embodiments.

Figure 1:
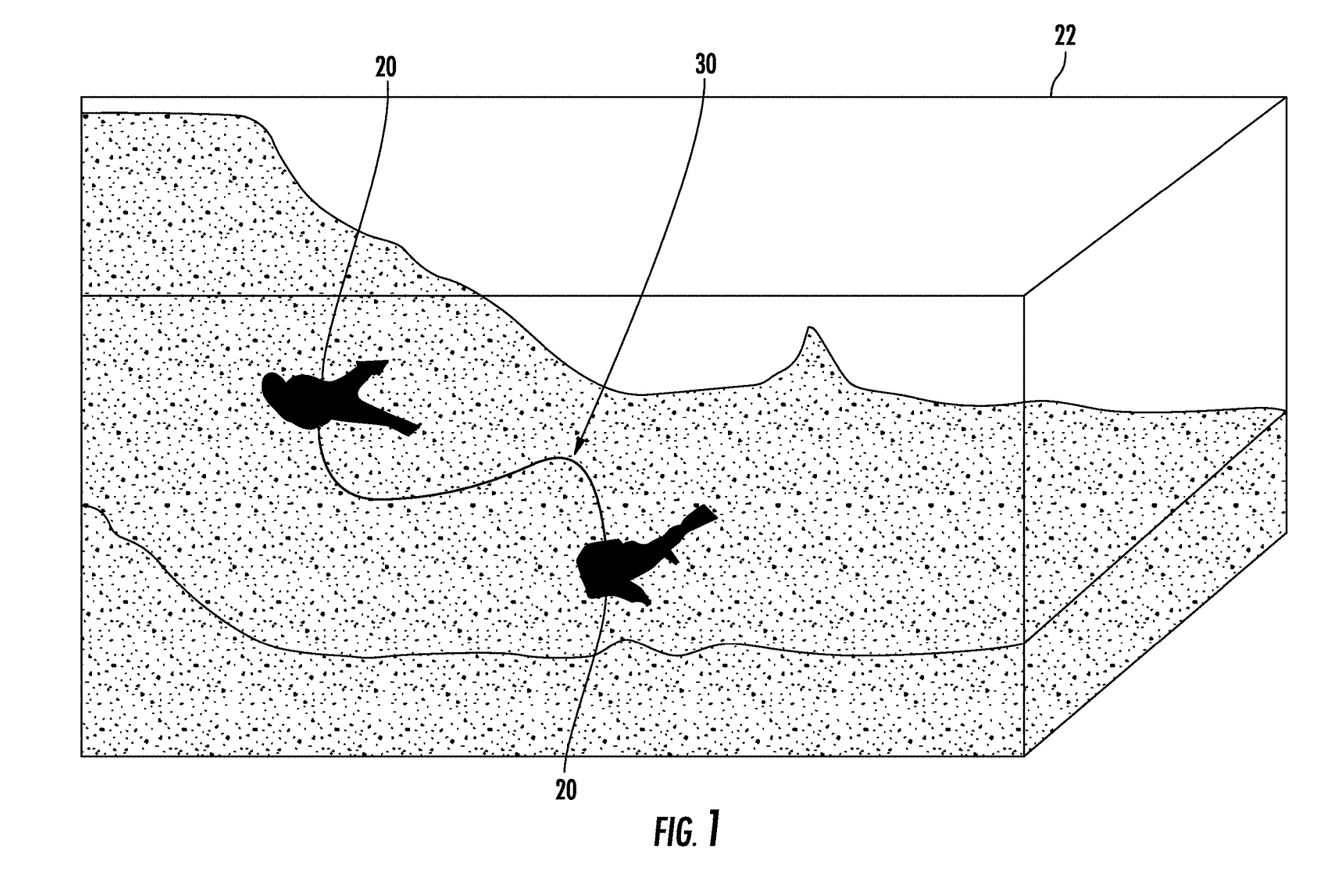
FIG. 1 is a view of two underwater divers communicating with one another via an underwater fiber optic cable with buoyancy control in accordance with the disclosure.

Referring initially to FIG. 1, an underwater fiber optic cable 30 with a predetermined buoyancy has many applications, such as a communications link between a pair of underwater divers 20. Based on an intended diving depth of the divers 20 within the illustrated water environment 22, the underwater fiber optic cable 30 is configured to have a predetermined buoyancy at that depth. The underwater fiber optic cable 30 with this predetermined buoyancy advantageously reduces the weight and drag of the cable. This allows the divers 20 to more easily move within the water environment 22 which helps to conserve their oxygen.

One embodiment of the underwater fiber optic cable 30 with the predetermined buoyancy will be discussed with reference to FIG. 2. The underwater fiber optic cable 30 includes an optical fiber 32 surrounded by tensile strength members 34. The tensile strength members 34 strengthen the underwater fiber optic cable 30 while allowing air gaps 36 between adjacent tensile strength members. Each tensile strength member 34 is made up of a plurality of ultra-high tensile strength yarns parallel wrapped together. The air gaps 36 allow for pressure relief and mobility of the fiber optic cable 32.

An inner jacket 38 surrounds the fiber optic cable 30 and the tensile strength members 34. An outer jacket 40 with buoyancy control surrounds the inner jacket 38. A protective coating layer 42 surrounds the outer jacket 40. The protective coating layer 42 may comprise a hydrophobic material, for example, which repels water so as to prevent items within the water environment 22 from adhering to the cable 40.

Buoyancy control of the outer jacket 40 will now be discussed in greater detail. More particularly, the outer jacket 40 comprises a polymer 50 having a first density, and a plurality of particles 52 distributed throughout the polymer having a second density greater than the first density. The plurality of particles 52 have a volume fraction with respect to the polymer 50 to thereby provide the underwater cable 30 with a predetermined buoyancy.

The buoyancy of the underwater fiber optic cable 30 may thus be determined by setting the predetermined volume of the particles 52 added to the outer jacket 40. The particles 52 added to the outer jacket 40 may be referred to as nanoparticles and are advantageously sized so that when distributed throughout the polymer 50 a diameter of the outer jacket 40 remains the same. This allows buoyancy control of the underwater fiber optic cable 30 to be independent of other cable parameters.

The polymer 50 may comprise a thermoplastic elastomer (TPE). Alternatively, the polymer 50 may be based on an engineered thermoplastic polyetherester elastomer known as Hytrel®. Hytrel® is a block copolymer of a hard-segment (PBT) and a soft-segment (polyether), and may offer many of the desirable characteristics and processing capability of engineering thermoplastics together with rubber elasticity. Hytrel® thus combines the flexibility of rubber with the strength and processability of thermoplastics.

The particles 52 added to the polymer 50, which are also referred to as nanoparticles, typically have an average size less than 500 nm, for example. More specifically, the particles 52 may have an average size in a range of 100 nm to 300 nm, for example.

The particles 52 may be titanium dioxide, zinc dioxide and/or zinc sulfide particles, for example. Other high density oxides may be used as particles 52, as readily appreciated by those skilled in the art. The particles 52 added to the jacket 40 essentially weight down the optical fiber cable 30 to obtain the desired buoyancy. Alternatively, less dense glass microspheres may be added to the jacket 40 to essentially lift up the optical fiber cable to obtain the desired buoyancy, such as for embodiments with different buoyancies along the length of the cable 30, as described below.

Figure 2:
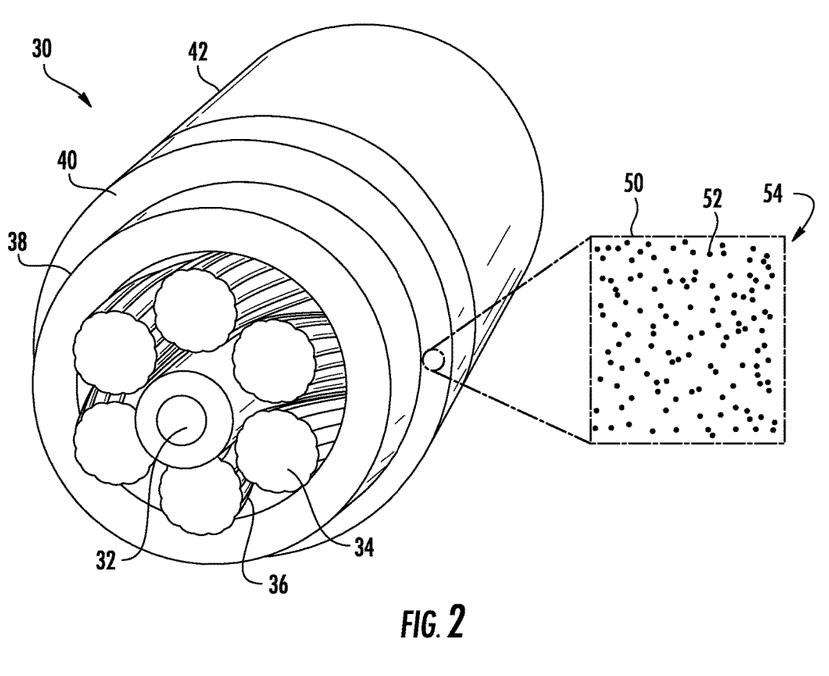
FIG. 2 is a perspective end view of the underwater fiber optic cable with buoyancy control illustrated in FIG. 1.

Still referring to FIG. 2, an enlarged image 54 of a portion of the outer jacket 40 shows that the particles 52 are uniformly dispersed within the polymer 50. Such an image 54 may be obtained by an electron microscope. If the particles 52 are too large, they would have a tendency to be lumped together within the polymer 50. Alternatively, if the particles 52 are too small, they would have minimal impact on buoyancy control.

The particles 52 may have a volume fraction of less than 0.4, for example. More specifically, the particles 52 may have a volume fraction in a range of 0.1 to 0.3, for example. Changing the volume fraction of particles 52 within the polymer 50 advantageously changes the buoyancy of the underwater fiber optic cable 30.

The underwater fiber optic cable 30 may be sized so that it may be also referred to as a micro cable. The outer jacket 40 may have an outer diameter less than 5 mm, for example. More specifically, the outer jacket 40 may have an outer diameter in a range of 500 um to 3.5 mm, for example, in some embodiments.

Figure 3:
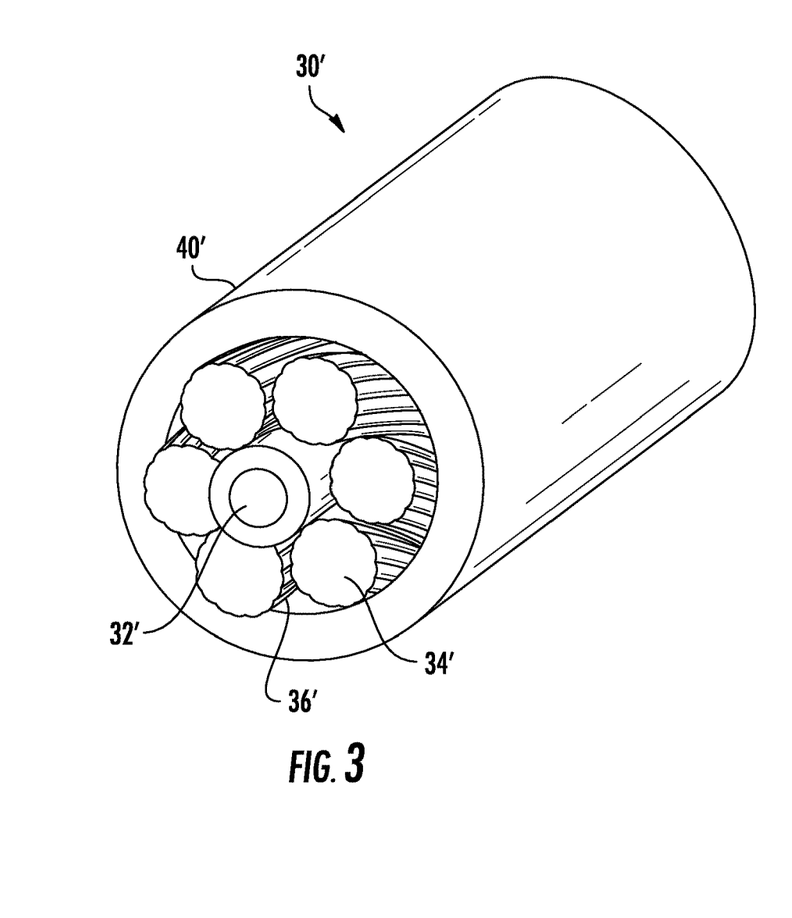
FIGS. 3-5 are perspective end views of different embodiments of the underwater fiber optic cable with buoyancy control illustrated in FIG. 1.
Figure 4:
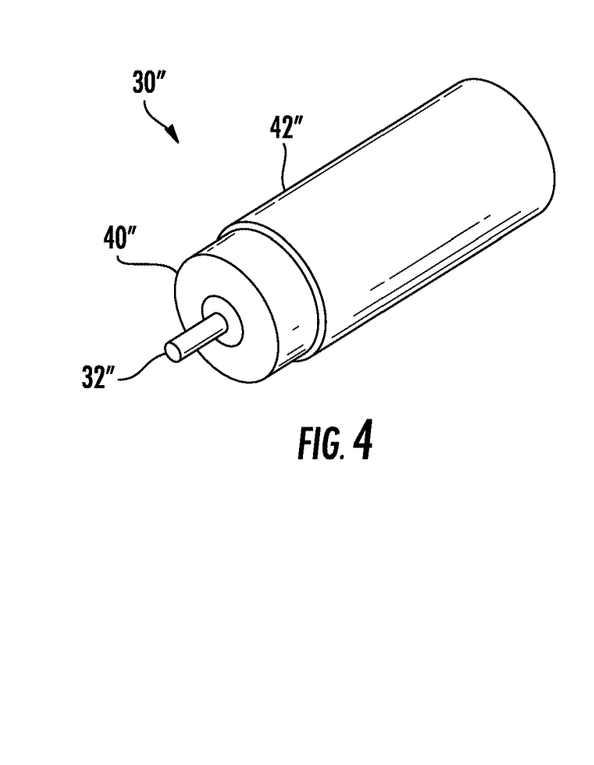
Figure 5:
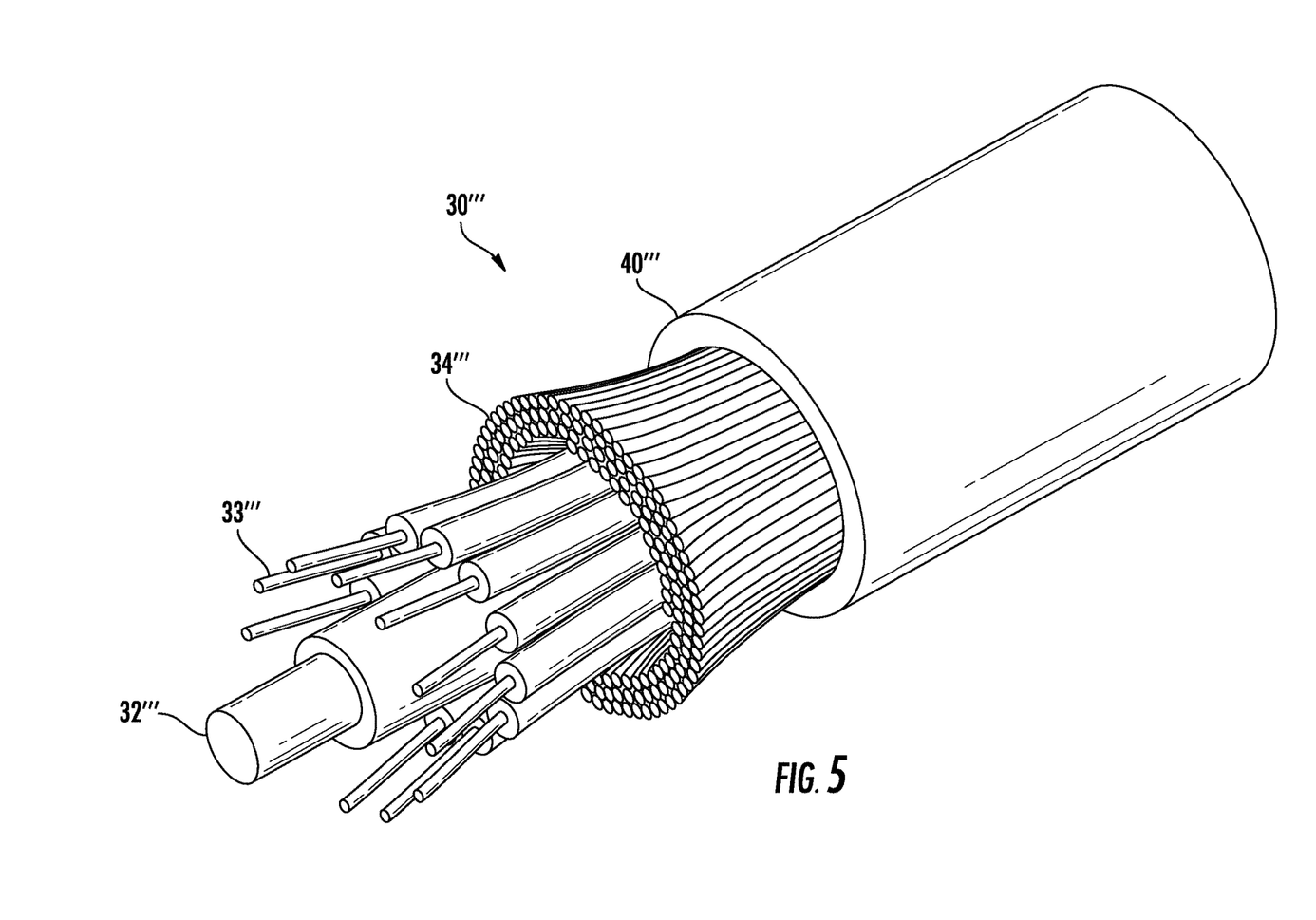

Referring now to FIGS. 3-5, other embodiments of the underwater fiber optic cable 30 will now be discussed. In one embodiment, the underwater fiber optic cable 30' as illustrated in FIG. 3 does not include an inner jacket. Instead, the outer jacket 40' surrounds the optical fiber 32' and the tensile strength members 34'.

In another embodiment, the underwater fiber optic cable 30" as illustrated in FIG. 4 does not include an inner jacket and tensile strength members. Instead, the outer jacket 40" surrounds the optical fiber 32".

In yet another embodiment, the underwater fiber optic cable 30'" as illustrated in FIG. 5 further includes electrical conductors 33'" in addition to the optical fiber 32'" but does not include the inner jacket. The outer jacket 40'" surrounds the optical fiber 32'" and the electrical conductors 33'".

Figure 6:
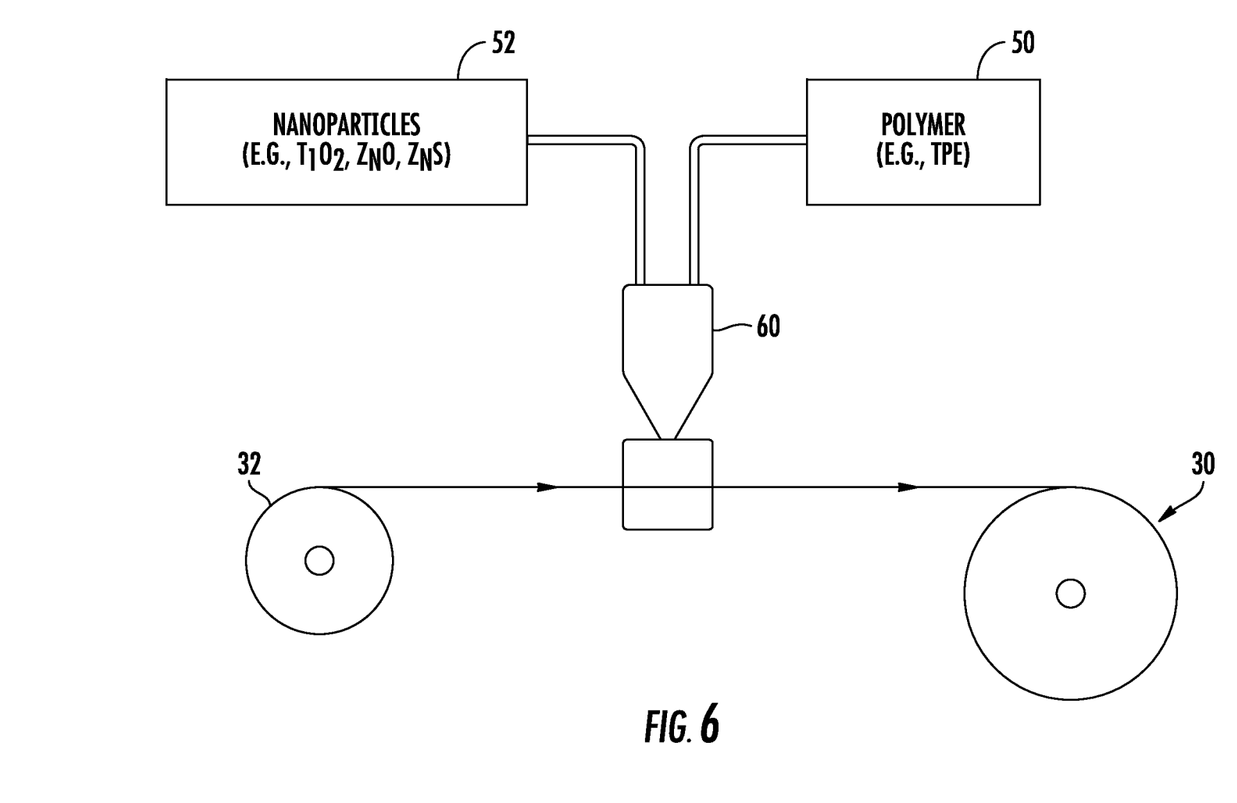
FIG. 6 is a schematic diagram of an extruder used to make the underwater fiber optic cable with buoyancy control in accordance with the disclosure.

An extruder 60, as illustrated in FIG. 6, may be used to form the underwater fiber optic cable 30 with the predetermined buoyancy. The extruder 60 receives the polymer 50 and the particles 52 to form a jacket 40 surrounding the optical fiber 32 as it is advanced along a path.

Figure 7:
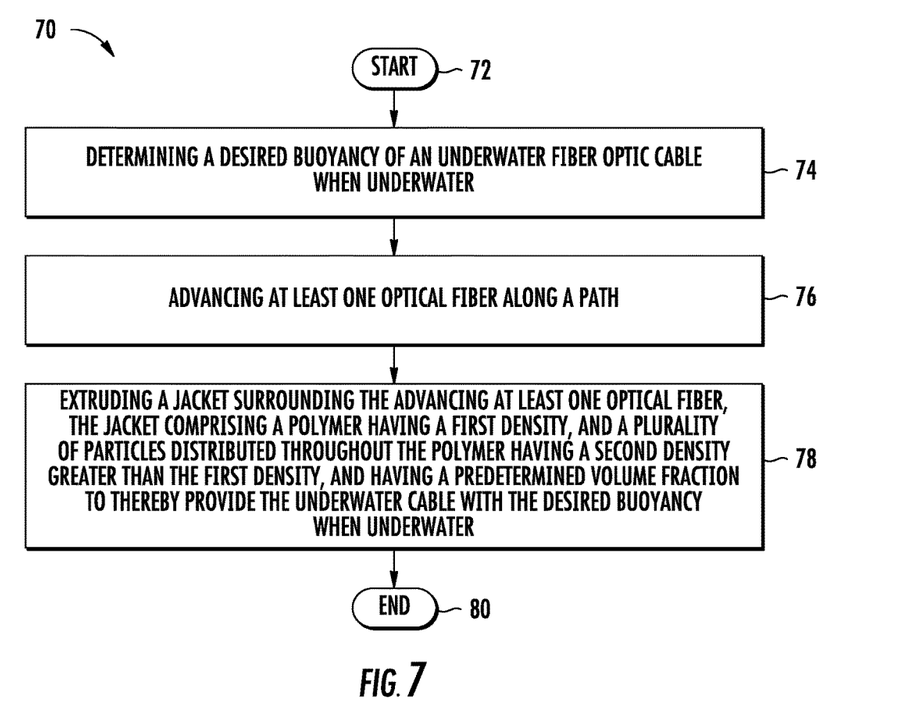
FIG. 7 is a flowchart illustrating a method for making an underwater fiber optic cable where the buoyancy control remains the same along a length of the cable in accordance with the disclosure.

One method for making the underwater fiber optic cable 30 where the buoyancy control remains the same along the length of the optic fiber cable 30 will now be discussed in reference to the flowchart 70 in FIG. 7. From the start (Block 72), the method comprises determining the desired buoyancy of the underwater fiber optic cable 30 when underwater at Block 74. Several factors are examined when determining the desired buoyancy, such as the salinity of the water, the operating depth of the cable, and the specific gravity of the cable based on its construction.

The method includes operating the extruder 60 while advancing at least one optical fiber 32 along a path at Block 76. As the optical fiber 32 passes through the extruder 60, a jacket 40 is formed surrounding the advancing optical fiber at Block 78. As discussed above, the jacket 40 includes a polymer 50 having a first density, and a plurality of particles 52 distributed throughout the polymer having a second density greater than the first density. The particles 52 have a predetermined volume fraction with respect to the polymer 50 to thereby provide the underwater fiber optic cable 30 with the predetermined buoyancy when underwater. The method ends at Block 80.

Another distinctive feature of the underwater fiber optic cable 30 is that the predetermined volume fraction of the particles 52 may vary along a length of the jacket 40 so that the predetermined buoyancy varies along the length of the jacket. This is accomplished while the jacket 40 advantageously has a constant outer diameter along the length of the jacket as the predetermined buoyancy varies. Since the diameter of the fiber optic cable 30 remains constant, this means that the size of the spools used to store and transport the cable remains unchanged even though the buoyancy of the cable varies its length.

Figure 8:
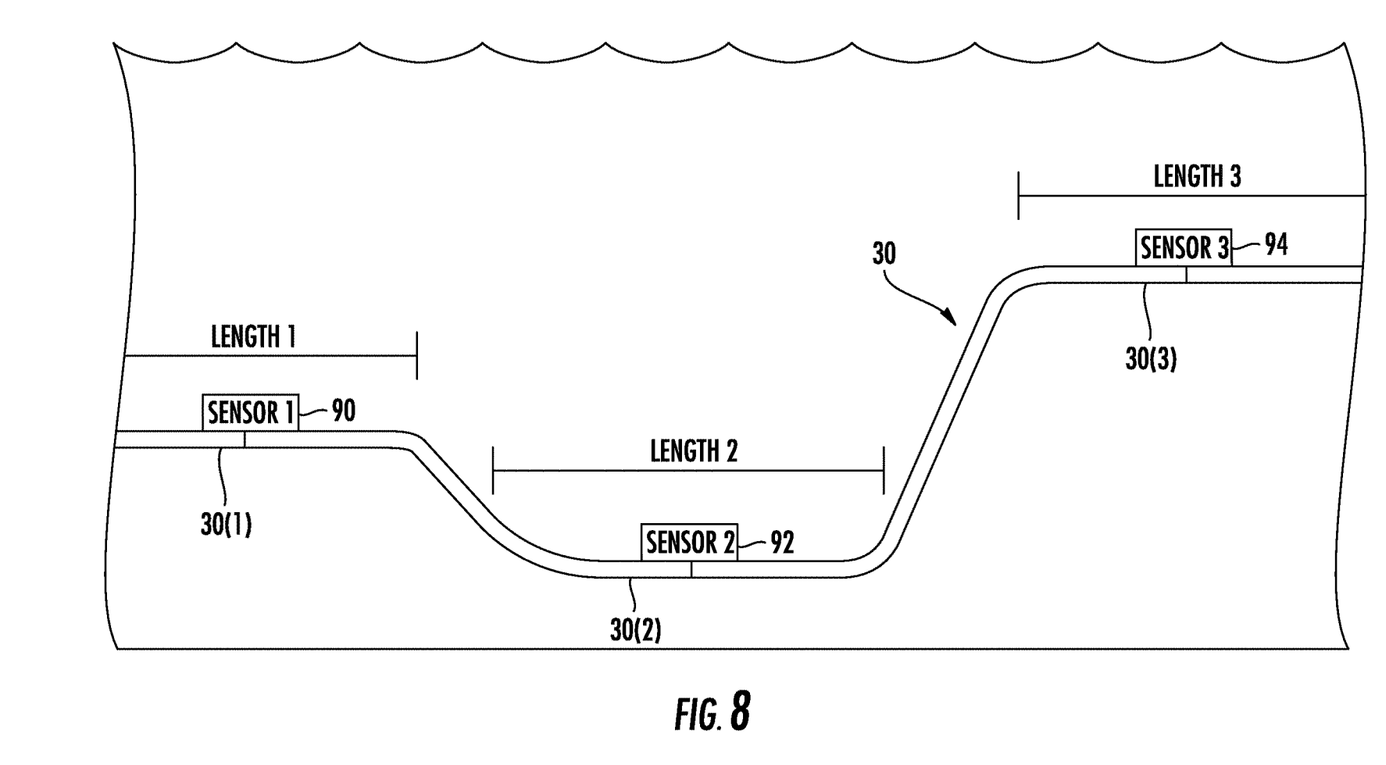
FIG. 8 is a view of an underwater fiber optic cable in an underwater environment where the buoyancy varies along a length of the cable in accordance with the disclosure.

As an illustrated example provided in FIG. 8, the underwater fiber optic cable 30 is attached to three different sensors 90, 92 and 94 that may be used for marine seismic surveying. It is often desirable to vary the depth of the sensors 90, 92 and 94 in the area of the underwater environment being monitored.

Varying the depth of the sensors 90, 92 and 94 is accomplished by having different lengths of the underwater fiber optic cable 30 with different buoyancies. For example, a first sensor 90 is coupled to a first length 30(1) of the underwater fiber optic cable 30 having a first predetermined buoyancy. The first predetermined buoyancy corresponds to a first desired depth of the first sensor 90.

Similarly, a second sensor 92 is coupled to a second length 30(2) of the underwater fiber optic cable 30 having a second predetermined buoyancy. The volume fraction of the particles 52 with respect to the polymer 50 in the jacket 40 in the second length 30(2) is increased as compared to the first length 30(1) so that the cable is more dense or weighted down.

A third sensor 94 is coupled to a third length 30(3) of the underwater fiber optic cable 30 having a third predetermined buoyancy. The third sensor 94 is not as deep as the first and second sensors 90, 92. Consequently, the volume fraction of the particles 52 with respect to the polymer 50 in the jacket 40 in the third length 30(3) is reduced as compared to the first and second lengths 30(1), 30(2) so that the cable is less dense or weighted down. Of course, glass microspheres could be added to increase buoyancy, as readily appreciated by those skilled in the art.

The extruder 60 as illustrated in FIG. 6 may also be used to form the underwater fiber optic cable 30 with different lengths having different buoyancies. The extruder 60 receives the polymer 50 while the volume fraction of the particles 52 is varied to form a jacket 40 surrounding the optical fiber 32 as it is advanced along a path.

Figure 9:
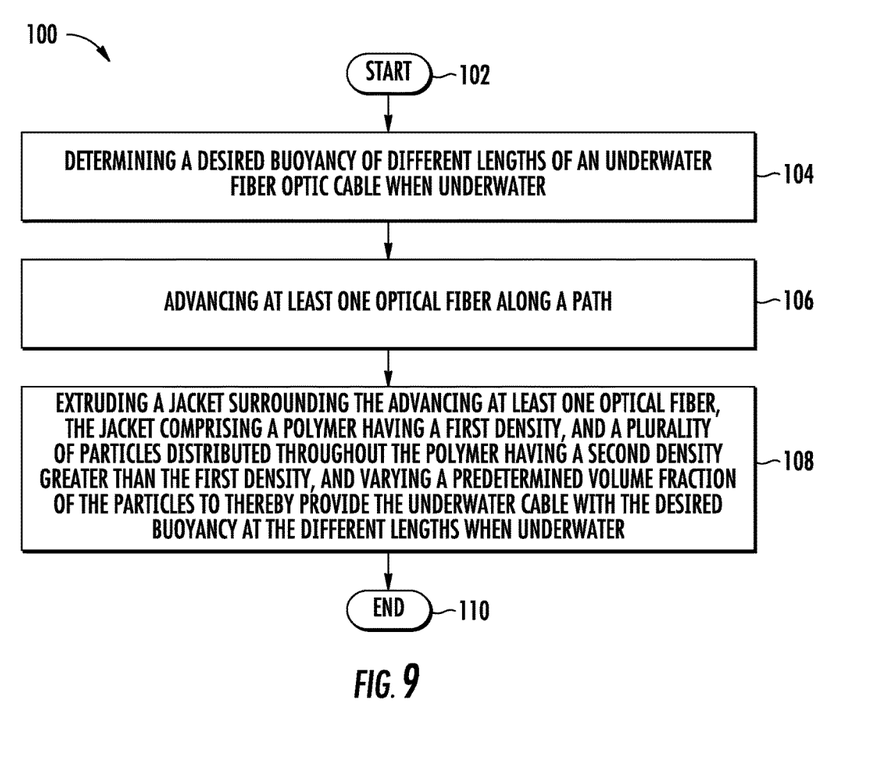
FIG. 9 is a flowchart illustrating a method for making an underwater fiber optic cable where the buoyancy control varies along the length of the cable in accordance with the disclosure.

The method for making the underwater fiber optic cable 30 where the buoyancy control varies along a length of the fiber optic cable 30 will now be discussed in reference to the flowchart 100 in FIG. 9. From the start (Block 102), the method comprises determining the desired buoyancy of the underwater fiber optic cable 30 at different lengths when underwater at Block 104. As noted above, several factors are examined when determining the desired buoyancy, such as the salinity of the water, the operating depth of the cable, and the specific gravity of the cable based on its construction.

The method includes operating the extruder 60 while advancing at least one optical fiber 32 along a path at Block 106. As the optical fiber 32 passes through the extruder 60, a jacket 40 is formed surrounding the advancing optical fiber at Block 108. As discussed above, the jacket 40 includes a polymer 50 having a first density, and a plurality of particles 52 distributed throughout the polymer having a second density greater than the first density. The particles 52 have a predetermined volume fraction with respect to the polymer 50 is varied to thereby provide the underwater fiber optic cable 30 with the desired buoyancy at the different lengths 30(1), 30(2), 30(3) when underwater. The method ends at Block 110.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method for making an underwater fiber optic cable having a desired buoyancy and without changing a specified outer diameter of the underwater fiber optic cable to provide the desired buoyancy, the method comprising:

determining a volume of nanoparticles to be added to a polymer for a jacket surrounding at least one optical fiber to obtain the desired buoyancy;

advancing the at least one optical fiber along a path;

feeding the polymer having a first density to an extruder;

feeding the nanoparticles having a second density greater than the first density to the extruder based on the determined volume of nanoparticles to the polymer; and extruding the jacket surrounding the advancing at least one optical fiber, with the nanoparticles being distributed throughout the polymer at the determined volume to thereby provide the underwater cable with the desired buoyancy without changing the specified outer diameter of the underwater fiber optic cable.

2. The method according to claim 1 wherein the nanoparticles have an average size less than 500 nm.

3. The method according to claim 1 wherein the nanoparticles have a volume fraction of less than 0.4.

4. The method according to claim 1 wherein the jacket has an outer diameter less than 5 mm.

5. The method according to claim 1 wherein the determined volume varies along a length of the jacket so that the desired buoyancy varies along the length of the jacket, with the jacket having a constant outer diameter along the length of the jacket as the desired buoyancy varies.

6. The method according to claim 1 wherein the nanoparticles comprise at least one of titanium dioxide, zinc dioxide and zinc sulfide.

7. The method according to claim 1 wherein the polymer comprises a thermoplastic elastomeric polymer.

8. A method for making an underwater fiber optic cable having an outer diameter less than or equal to 5 mm and with a desired buoyancy, the method comprising:

determining a volume of nanoparticles to be added to a polymer for a jacket surrounding at least one optical fiber to obtain the desired buoyancy;

advancing the at least one optical fiber along a path;

feeding the polymer having a first density to an extruder;

feeding the nanoparticles having a second density greater than the first density to the extruder based on the determined volume of nanoparticles to the polymer; and extruding the jacket surrounding the advancing at least one optical fiber, with the nanoparticles being distributed throughout the polymer at the determined volume to thereby provide the underwater cable with the desired buoyancy without increasing the outer diameter of the underwater fiber optic cable beyond 5 mm.

9. The method according to claim 8 wherein the nanoparticles have an average size less than 500 nm.

10. The method according to claim 8 wherein the nanoparticles have a volume fraction of less than 0.4.

11. The method according to claim 8 wherein the determined volume varies along a length of the jacket so that the desired buoyancy varies along the length of the jacket, with the jacket having a constant outer diameter along the length of the jacket as the desired buoyancy varies.

12. The method according to claim 8 wherein the nanoparticles comprise at least one of titanium dioxide, zinc dioxide and zinc sulfide.

13. The method according to claim 8 wherein the polymer comprises a thermoplastic elastomeric polymer.

* * * * *